US012604279B2

(12) United States Patent
Lagnado et al.

(10) Patent No.: US 12,604,279 B2
(45) Date of Patent: Apr. 14, 2026

(54) INDICATORS FOR RADIO TRANSMISSIONS

(71) Applicant: Hewlett-Packard Development Company, L.P., Spring, TX (US)

(72) Inventors: Isaac Lagnado, Spring, TX (US); Steven Petit, Spring, TX (US); Danny Farnyih Meng, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 433 days.

(21) Appl. No.: 18/042,192

(22) PCT Filed: Oct. 19, 2020

(86) PCT No.: PCT/US2020/056362
§ 371 (c)(1),
(2) Date: Feb. 17, 2023

(87) PCT Pub. No.: WO2022/086494
PCT Pub. Date: Apr. 28, 2022

(65) Prior Publication Data
US 2023/0319733 A1    Oct. 5, 2023

(51) Int. Cl.
H04W 52/34 (2009.01)

(52) U.S. Cl.
CPC .................................. H04W 52/34 (2013.01)

(58) Field of Classification Search
CPC ................................ H04W 4/02; H04W 4/023
See application file for complete search history.

(56) References Cited

U.S. PATENT DOCUMENTS

| | | | | |
|---|---|---|---|---|
| 7,319,854 B2* | 1/2008 | vonDoenhoff | ........ | H04W 28/16 455/345 |
| 8,045,922 B2* | 10/2011 | Sherman | ............... | H04W 16/14 370/328 |
| 8,817,623 B2* | 8/2014 | Gupta | ............... | H04W 28/0215 370/235 |
| 8,824,298 B2* | 9/2014 | Gupta | ............... | H04W 28/0247 370/235 |
| 8,847,754 B2* | 9/2014 | Buchheim | ............... | G01S 1/725 455/457 |

(Continued)

FOREIGN PATENT DOCUMENTS

| | | | | |
|---|---|---|---|---|
| EP | 1703679 A1 * | 9/2006 | ........... | H04B 7/2681 |
| EP | 1878282 B1 * | 1/2012 | ........ | H04M 1/72463 |

(Continued)

*Primary Examiner* — Hai V Nguyen

(74) *Attorney, Agent, or Firm* — Quarles & Brady LLP

(57) ABSTRACT

Examples of electronic devices are described herein. In some examples, an electronic device includes a first network device and a second network device. In some examples, the electronic device includes a first radio and a second radio. In some examples, the first radio is to receive a transmission that includes an indicator. In some examples, the electronic device also includes a processor to determine a transmission power level for the first radio based on the indicator. In some examples, the processor is to determine a transmission frequency for the first radio based on the indicator. In some examples, the processor is to disable transmission of the second radio based on the indicator.

20 Claims, 8 Drawing Sheets

Beacon Transmission *306*

Indicator *308*

Transmission Power Level *316*

Transmission Frequency *318*

Allowed Radio Technology Parameter *319*

Disabled Radio Technology Parameter *320*

(56) References Cited

U.S. PATENT DOCUMENTS

| | | | | |
|---|---|---|---|---|
| 8,880,047 | B2 * | 11/2014 | Konicek | H04M 1/72457 |
| | | | | 455/445 |
| 8,934,362 | B2 * | 1/2015 | Hsu | H04W 52/34 |
| | | | | 370/254 |
| 9,095,001 | B2 | 7/2015 | Lemmon et al. | |
| 9,210,450 | B2 * | 12/2015 | Healy | H04N 21/2182 |
| 9,220,072 | B2 * | 12/2015 | Hsu | H04W 52/367 |
| 9,380,507 | B2 | 6/2016 | Bradley et al. | |
| 9,510,133 | B2 * | 11/2016 | Gupta | H04W 28/0289 |
| 9,571,863 | B2 * | 2/2017 | Healy | H04N 21/8456 |
| 9,730,157 | B2 | 8/2017 | Puranik et al. | |
| 9,781,750 | B2 * | 10/2017 | Kephart, Jr. | H04W 88/10 |
| 9,888,351 | B2 * | 2/2018 | Olson | H04W 4/023 |
| 9,902,368 | B2 * | 2/2018 | Maiwand | G07C 9/00896 |
| 9,967,713 | B2 * | 5/2018 | Buchheim | H04W 4/80 |
| 10,244,377 | B2 * | 3/2019 | Bloechl | H04W 4/80 |
| 10,264,436 | B1 * | 4/2019 | Wohler | H04W 8/26 |
| 10,278,006 | B2 * | 4/2019 | Chandrasekaran | G06Q 20/405 |
| 10,314,054 | B2 * | 6/2019 | Pao | H04L 1/1812 |
| 10,333,826 | B1 * | 6/2019 | Govindswamy | H04L 45/127 |
| 10,499,430 | B2 * | 12/2019 | Gupta | H04W 74/0816 |
| 10,623,122 | B2 * | 4/2020 | Gledich | H04W 4/48 |
| 10,699,292 | B2 * | 6/2020 | Vesikivi | G06Q 30/0242 |
| 10,769,392 | B1 * | 9/2020 | Gravelle | H04W 4/027 |
| 10,811,201 | B1 * | 10/2020 | Files | G06F 3/1446 |
| 10,856,155 | B2 * | 12/2020 | Scahill | H04W 16/20 |
| 10,887,759 | B1 * | 1/2021 | Wang | H04W 4/80 |
| 11,113,415 | B1 * | 9/2021 | Amico | H04W 12/02 |
| 11,115,841 | B2 * | 9/2021 | Lagnado | H04W 48/16 |
| 11,144,901 | B1 * | 10/2021 | Dennis | G06Q 20/227 |
| 11,228,955 | B2 * | 1/2022 | Lin | H04W 36/304 |
| 11,252,262 | B2 * | 2/2022 | Alex | H04W 72/51 |
| 11,272,556 | B2 * | 3/2022 | Hariharan | H04W 76/14 |
| 11,292,236 | B1 * | 4/2022 | Wang | G06F 1/1675 |
| 11,323,879 | B2 * | 5/2022 | Lagnado | G06F 21/44 |
| 11,334,918 | B2 * | 5/2022 | Proctor, Jr. | H04W 8/26 |
| 11,363,131 | B2 * | 6/2022 | James | H04M 1/72457 |
| 11,391,830 | B2 * | 7/2022 | Au | H04W 48/16 |
| 11,625,458 | B2 * | 4/2023 | Armstrong | G06F 21/34 |
| | | | | 726/26 |
| 11,627,105 | B2 * | 4/2023 | Hviid | H04L 51/52 |
| | | | | 709/206 |
| 11,636,463 | B2 * | 4/2023 | Mimassi | H04W 12/06 |
| | | | | 705/17 |
| 11,678,141 | B2 * | 6/2023 | Daoura | H04W 52/0229 |
| | | | | 370/318 |
| 11,687,913 | B2 * | 6/2023 | Lee | G06K 7/10306 |
| | | | | 705/44 |
| 11,756,034 | B2 * | 9/2023 | Stoddart | G06Q 20/325 |
| | | | | 705/44 |
| 11,843,668 | B2 * | 12/2023 | Alex | H04W 72/54 |
| 11,849,815 | B2 * | 12/2023 | Chui | A44B 11/2592 |
| 11,861,680 | B2 * | 1/2024 | Vigier | H04W 4/80 |
| 11,882,223 | B2 * | 1/2024 | Van Duren | H04L 9/3297 |
| 11,956,191 | B2 * | 4/2024 | Hviid | H04R 1/1016 |
| 11,995,685 | B2 * | 5/2024 | Proctor, Jr. | G06Q 30/0261 |
| 12,192,885 | B2 * | 1/2025 | Zhao | H04W 48/16 |
| 12,236,296 | B2 * | 2/2025 | Leung | G06K 19/0702 |
| 2005/0073446 | A1 * | 4/2005 | Lazaridis | H01H 13/83 |
| | | | | 341/22 |
| 2006/0246892 | A1 * | 11/2006 | vonDoenhoff | H04W 28/16 |
| | | | | 455/427 |
| 2007/0155401 | A1 * | 7/2007 | Ward | H04W 64/00 |
| | | | | 455/456.1 |
| 2007/0237121 | A1 * | 10/2007 | Khandelwal | H04W 24/00 |
| | | | | 370/338 |
| 2009/0003278 | A1 * | 1/2009 | Abdel-Kader | H04W 48/18 |
| | | | | 370/331 |
| 2009/0005061 | A1 * | 1/2009 | Ward | G01S 5/021 |
| | | | | 455/566 |
| 2009/0137206 | A1 * | 5/2009 | Sherman | H04W 16/14 |
| | | | | 455/41.2 |
| 2009/0197584 | A1 * | 8/2009 | Snow | H04M 1/72463 |
| | | | | 455/418 |
| 2010/0008338 | A1 * | 1/2010 | Tsfati | H04B 1/0067 |
| | | | | 455/41.2 |
| 2010/0061326 | A1 * | 3/2010 | Lee | H04W 72/12 |
| | | | | 370/329 |
| 2010/0222081 | A1 * | 9/2010 | Ward | H04L 67/52 |
| | | | | 455/456.3 |
| 2010/0284380 | A1 * | 11/2010 | Banerjee | H04W 16/14 |
| | | | | 455/41.2 |
| 2012/0176923 | A1 * | 7/2012 | Hsu | H04W 52/367 |
| | | | | 370/252 |
| 2012/0302223 | A1 * | 11/2012 | Austin | H04W 72/21 |
| | | | | 455/418 |
| 2013/0028245 | A1 * | 1/2013 | Oerton | H04W 64/00 |
| | | | | 455/456.1 |
| 2013/0083661 | A1 * | 4/2013 | Gupta | H04W 48/06 |
| | | | | 370/235 |
| 2013/0083783 | A1 * | 4/2013 | Gupta | H04W 88/16 |
| | | | | 370/338 |
| 2013/0122807 | A1 * | 5/2013 | Tenarvitz | G08B 21/245 |
| | | | | 455/41.1 |
| 2013/0217332 | A1 * | 8/2013 | Altman | G06Q 20/3224 |
| | | | | 455/3.01 |
| 2014/0062695 | A1 * | 3/2014 | Rosen | G08B 21/0219 |
| | | | | 340/539.13 |
| 2014/0135042 | A1 * | 5/2014 | Buchheim | G01S 1/725 |
| | | | | 455/566 |
| 2014/0179226 | A1 * | 6/2014 | Witschnig | H04B 5/266 |
| | | | | 455/41.1 |
| 2014/0274225 | A1 * | 9/2014 | Lacatus | H04W 52/0241 |
| | | | | 455/574 |
| 2014/0353300 | A1 * | 12/2014 | Swiatek | H05B 3/34 |
| | | | | 219/211 |
| 2014/0369201 | A1 * | 12/2014 | Gupta | H04W 28/0247 |
| | | | | 370/235 |
| 2014/0370917 | A1 * | 12/2014 | Buchheim | H04W 4/023 |
| | | | | 455/456.1 |
| 2015/0071259 | A1 * | 3/2015 | Lee | H04W 56/00 |
| | | | | 370/336 |
| 2015/0358892 | A1 | 12/2015 | Pandey et al. | |
| 2016/0050589 | A1 * | 2/2016 | Safavi | H04W 36/0033 |
| | | | | 455/436 |
| 2016/0318625 | A1 * | 11/2016 | Troy | G06K 7/1413 |
| 2017/0019769 | A1 * | 1/2017 | Li | H04W 4/029 |
| 2017/0064745 | A1 * | 3/2017 | Kephart, Jr. | H04W 76/10 |
| 2017/0105096 | A1 * | 4/2017 | Olson | H04W 4/023 |
| 2017/0228566 | A1 * | 8/2017 | Sengstaken, Jr. | G06K 19/0717 |
| 2017/0238140 | A9 * | 8/2017 | Buchheim | H04W 4/026 |
| | | | | 455/456.1 |
| 2017/0245101 | A1 * | 8/2017 | Chandrasekaran | H04L 67/52 |
| 2017/0256155 | A1 * | 9/2017 | Sengstaken, Jr. | G06K 19/0723 |
| 2018/0009416 | A1 * | 1/2018 | Maiwand | G07C 9/00896 |
| 2018/0040016 | A1 * | 2/2018 | Vesikivi | G06Q 30/0242 |
| 2018/0049003 | A1 * | 2/2018 | Maulsby | G06Q 30/0224 |
| 2018/0092011 | A1 | 3/2018 | Lin et al. | |
| 2018/0262866 | A1 * | 9/2018 | Haverinen | H04W 4/80 |
| 2018/0367973 | A1 * | 12/2018 | Bloechl | H04W 4/80 |
| 2019/0021115 | A1 * | 1/2019 | Gupta | H04W 72/1215 |
| 2019/0190631 | A1 * | 6/2019 | Gleditch | H04W 4/42 |
| 2019/0200289 | A1 * | 6/2019 | Panje | H04W 52/0209 |
| 2019/0319868 | A1 * | 10/2019 | Svennebring | H04W 24/08 |
| 2019/0320407 | A1 * | 10/2019 | Goyal | H04L 41/5058 |
| 2019/0387415 | A1 * | 12/2019 | Scahill | H04W 16/20 |
| 2020/0037284 | A1 * | 1/2020 | Oerton | H04W 24/02 |
| 2020/0275369 | A1 * | 8/2020 | Foster | G06F 1/3287 |
| 2020/0300972 | A1 * | 9/2020 | Wang | A61B 5/0002 |
| 2020/0319324 | A1 * | 10/2020 | Au | H04W 48/16 |
| 2020/0329385 | A1 * | 10/2020 | Lagnado | H04W 48/16 |
| 2021/0027608 | A1 * | 1/2021 | Shakedd | G08B 21/24 |
| 2021/0126988 | A1 * | 4/2021 | Alex | H04W 72/54 |
| 2021/0204228 | A1 * | 7/2021 | Lagnado | H04W 52/283 |
| 2021/0204302 | A1 * | 7/2021 | Hareuveni | H04W 72/23 |
| 2021/0219198 | A1 * | 7/2021 | Lin | H04W 36/304 |
| 2021/0336797 | A1 * | 10/2021 | Van Duren | H04L 9/0825 |
| 2021/0394766 | A1 * | 12/2021 | Crawford | B60W 50/087 |
| 2022/0124607 | A1 * | 4/2022 | Zhao | H04W 48/16 |

(56) References Cited

U.S. PATENT DOCUMENTS

| | | | | |
|---|---|---|---|---|
| 2022/0174470 A1* | 6/2022 | Stridkvist | ......... | H04W 56/0015 |
| 2022/0247837 A1* | 8/2022 | Alex | ..................... | H04W 72/12 |
| 2022/0303331 A1* | 9/2022 | Svennebring | .... | H04N 21/44209 |
| 2022/0414639 A1* | 12/2022 | Stoddart | .............. | G06Q 20/325 |
| 2022/0414658 A1* | 12/2022 | Stoddart | ............... | H04W 12/03 |
| 2023/0128550 A1* | 4/2023 | Leung | ............... | G06Q 10/0833 |
| | | | | 455/41.2 |
| 2023/0196038 A1* | 6/2023 | Leung | ............... | G06K 19/0717 |
| | | | | 235/494 |
| 2023/0196267 A1* | 6/2023 | Leung | ............... | G06Q 10/0833 |
| | | | | 705/333 |
| 2023/0328633 A1* | 10/2023 | Mohandass | ........... | H04W 48/10 |
| | | | | 370/329 |
| 2024/0311745 A1* | 9/2024 | Gutlapalli | .......... | G06Q 10/0833 |
| 2025/0106762 A1* | 3/2025 | Marwah | .............. | H04W 52/028 |

FOREIGN PATENT DOCUMENTS

| | | | | | |
|---|---|---|---|---|---|
| EP | 2915377 B1 * | 3/2017 | ........ | H04W 52/0216 |
| EP | 2915382 B1 * | 5/2017 | ........... | H04W 52/28 |
| EP | 3847838 B1 * | 3/2022 | ........... | H04W 72/23 |
| WO | WO-2019126373 A1 * | 6/2019 | ........ | H04N 21/2146 |
| WO | WO-2019231524 A1 * | 12/2019 | ........... | H04L 67/125 |

* cited by examiner

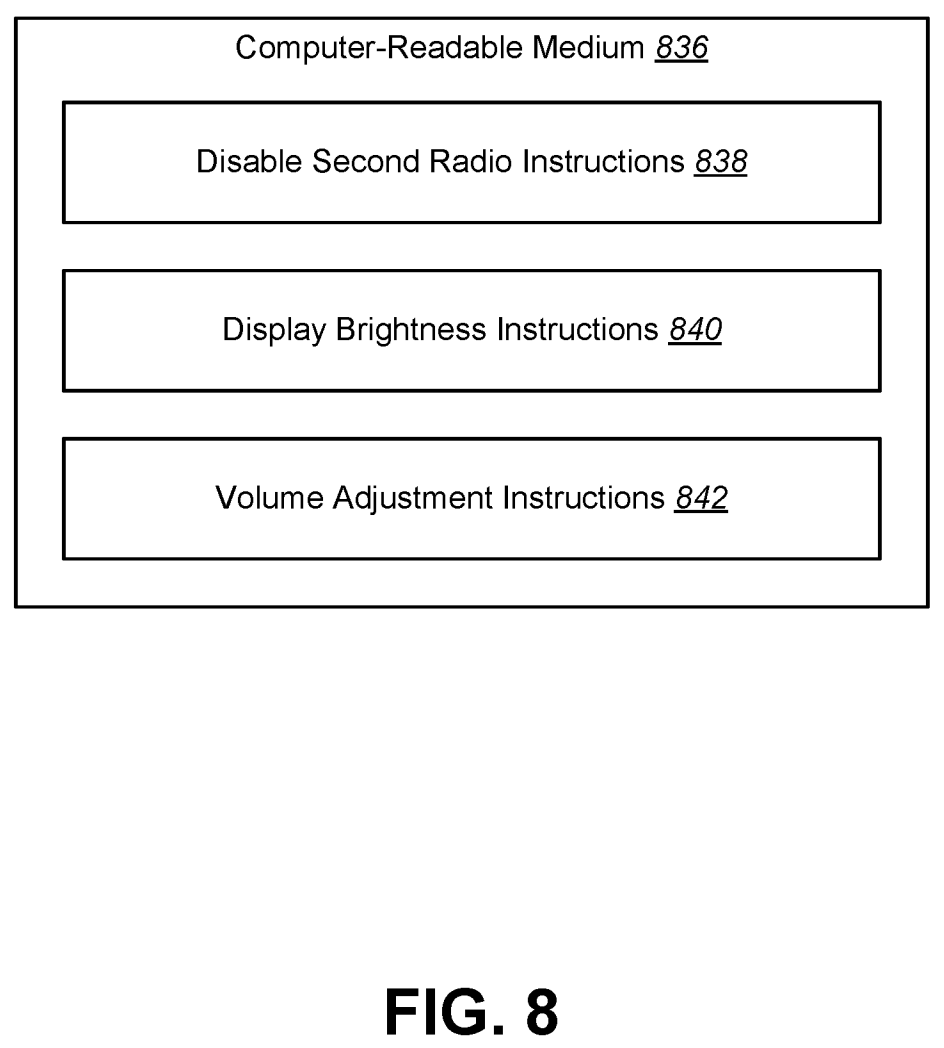

Computer-Readable Medium 836

Disable Second Radio Instructions 838

Display Brightness Instructions 840

Volume Adjustment Instructions 842

FIG. 8

INDICATORS FOR RADIO TRANSMISSIONS

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuits may be utilized to provide different varieties of electronic technology.

BRIEF DESCRIPTION OF THE DRAWINGS

Various examples will be described below by referring to the following figures.

FIG. 8 is a block diagram illustrating an example of a computer-readable medium for adjusting radio transmissions and device functionality based on an indicator.

Figure 1:
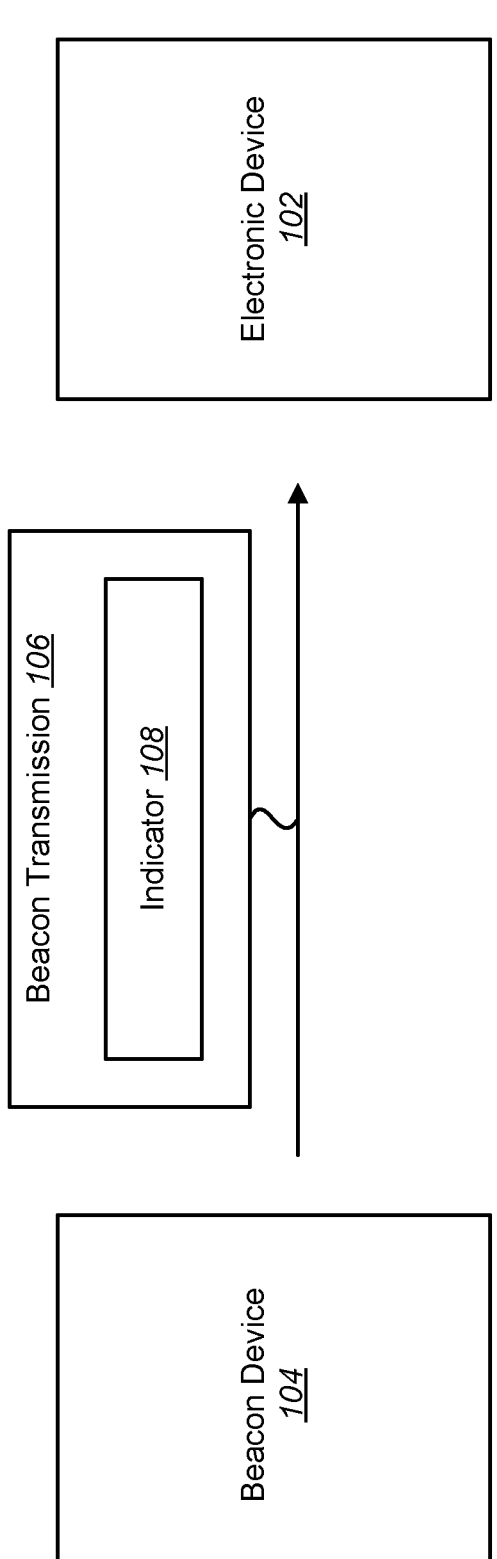
FIG. 1 is a block diagram illustrating an example of an electronic device to receive a beacon transmission from a beacon device.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

DETAILED DESCRIPTION

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, game controllers, smart appliances, printing devices, vehicles with electronic components, aircraft, drones, robots, smart appliances, etc.

In some examples, an electronic device may include multiple radios for wireless communication. As used herein, a radio includes circuitry (e.g., hardware) and instructions (e.g., software) for sending and receiving radio frequency (RF) signals. For example, a radio may include a transmitter for receiving RF signals and a receiver for receiving RF signals.

In some examples, the radios of the electronic device may operate according to different technologies. For example, a first radio may operate according to a first radio access technology (RAT) and a second radio may operate according to a second RAT. In some examples, the electronic device may include a WiFi radio for communication based on the Institute of Electrical and Electronics Engineers (IEEE) 802.11 standards. In other examples, the electronic device may include a Bluetooth (BT) radio. In yet other examples, the electronic device may include a wireless wide area network (WWAN) radio. Some examples of WWAN radios include radios for communicating using cellular network technology (e.g., 2G, 3G, 4G LTE, 5G, etc.).

A radio emits electromagnetic energy during transmission. In some examples, this electromagnetic energy may interfere with other electronic devices in the vicinity of the electronic device. For example, RF transmissions may interfere with sensors used in airplanes, hospitals, research facilities or other environments.

In some examples, when entering a particular area (e.g., an airplane hospital, etc.) an authority may request that radios be disabled. In some cases, it is up to the user of the electronic device to turn off the radios of the electronic device. However, with this approach, a user may not be aware of the request to disable radio communication and may fail to disable the radios on the electronic device. In other cases, the use of some RATs may be acceptable in a particular area while the use of other RATs may be restricted.

The examples described herein provide for automatically disabling or adjusting radios based on a broadcast beacon transmission. For example, a beacon device may broadcast a beacon transmission that includes an indicator. In some examples, this indicator may indicate to the electronic device how to adjust a first radio and/or whether to disable a second radio. For example, wireless technologies (e.g., WiFi or BT) may listen for transmissions before transmitting. With WiFi, for instance, an electronic device may first listen for a WiFi beacon frame that includes a service set identifier (SSID) (e.g., network name) before attempting to join a network or transmit on the network. In the case of BT, the electronic device may listen for a Bluetooth advertising packet before transmitting.

The electronic device may use a radio to listen for a beacon transmission with the indicator for suspending and/or modifying transmissions. For example, in the case an airplane, a transmission may be sent from a beacon device on the airplane. This transmission may include an indicator that indicates that wireless transmission is to be suspended or wireless transmissions are to be allowed during particular times (e.g., when the airplane is in the air, but not during takeoff and landing). In some examples, the beacon transmission including the indicator may be a WiFi beacon frame transmission or a Bluetooth advertising packet that includes the indicator. In some examples, the indicator may be a parameter (e.g., information element) included in the WiFi beacon frame transmission or Bluetooth advertising packet. Upon receiving the transmission, the electronic device may adjust or disable transmissions based on the indicator.

These examples provide for electronic devices to automatically enable particular technologies, particular transmission power levels, particular transmission frequencies and/or particular time periods of operation. These examples also provide for the use of one radio access technology (e.g., WiFi) to halt operation of a different radio access technology (e.g., WWAN).

These examples also provide for an electronic device to adjust various properties and functionality based on the indicator. For example, the electronic device may adjust display brightness, speaker volume, keyboard backlight, and/or power modes in response to receiving the beacon transmission with the indicator.

FIG. 1 is a block diagram illustrating an example of an electronic device 102 to receive a beacon transmission 106 from a beacon device 104. The beacon device 104 may transmit a beacon transmission 106 that includes an indicator 108. In some examples, the indicator 108 may include information about adjusting or modifying transmissions by the electronic device 102. In some examples, the beacon device 104 may include a transmitter for sending the beacon transmission 106. In some examples, the beacon device 104 may periodically broadcast the beacon transmission 106 at a certain rate.

In some examples, the beacon device 104 may be an access point (AP), a router, or other node on a network. In this case, the electronic device 102 may seek to access or may be connected to the network of the beacon device 104. In other examples, the beacon device 104 may be unconnected to a network or may be connected to a different network than the electronic device 102.

In some examples, the beacon device 104 may be a WiFi device. For example, the beacon transmission 106 may be a WiFi beacon frame that includes an SSID for the network of the beacon device 104. In other examples, the beacon device 104 may be a BT device. For example, the beacon transmission 106 may be a Bluetooth advertising packet.

In some examples, the indicator 108 may be included in the payload of the beacon transmission 106. For example, the indicator 108 may be a message, parameter or information element included in the payload (e.g., protocol data unit (PDU), frame body, etc.) of the beacon transmission 106.

Figure 2:
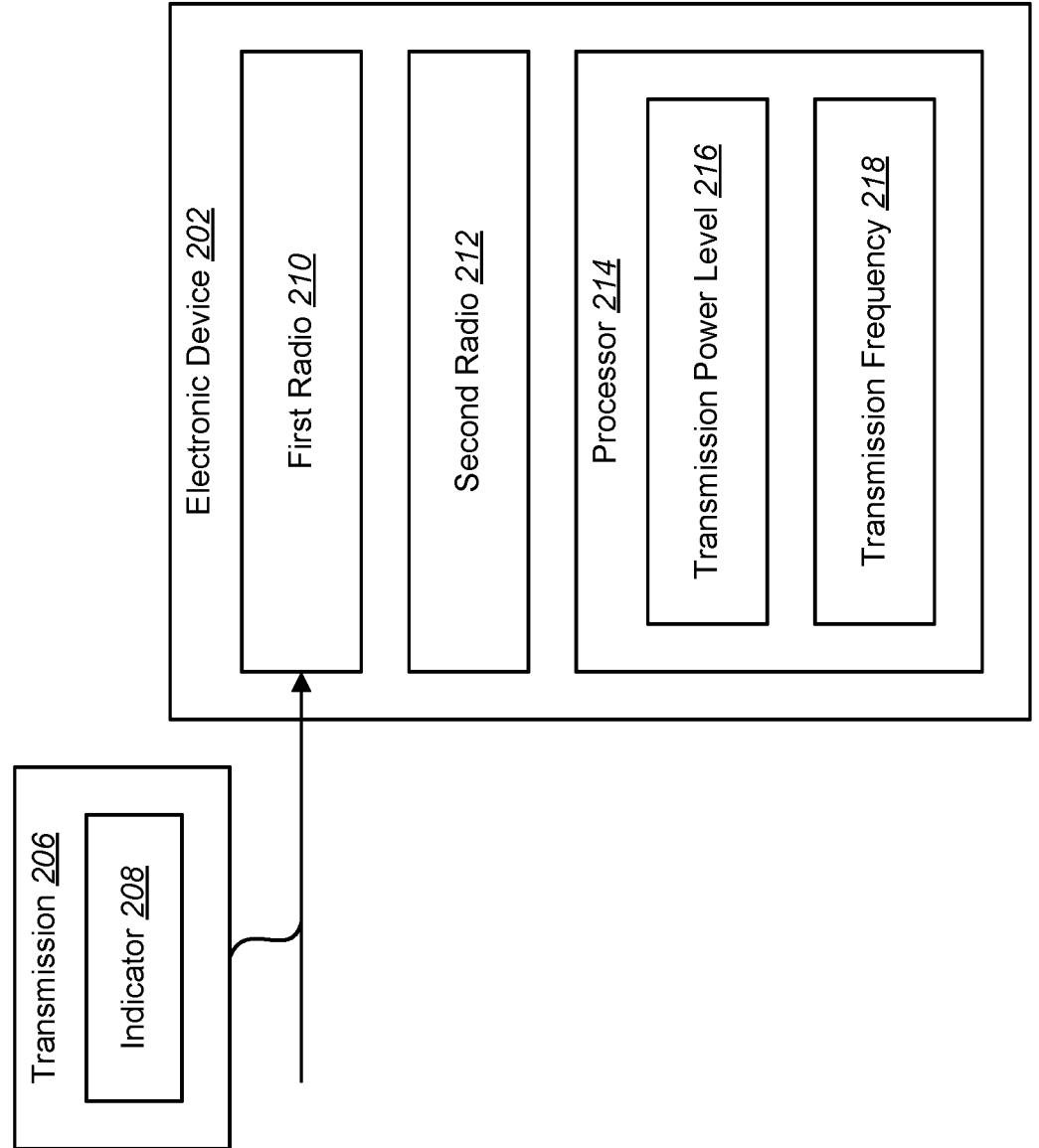
FIG. 2 is a block diagram illustrating an example of an electronic device to adjust radio transmissions based on an indicator.

FIG. 2 is a block diagram illustrating an example of an electronic device 202 to adjust radio transmissions based on an indicator 208. Examples of the electronic device 202 may include computing devices, laptop computers, desktop computers, tablet devices, cellular phones, smartphones, wireless communication devices, game consoles, gaming controllers, smart appliances, printing devices, vehicles with electronic components, aircraft, drones, robots, smart appliances, etc.

In some examples, the electronic device 202 may include a processor 214. The processor 214 may be any of a microcontroller (e.g., embedded controller), a central processing unit (CPU), a semiconductor-based microprocessor, graphics processing unit (GPU), field-programmable gate array (FPGA), an application-specific integrated circuit (ASIC), a circuit, a chipset, and/or other hardware device suitable for retrieval and execution of instructions stored in a memory. The processor 214 may fetch, decode, and/or execute instructions stored in memory (not shown). While a single processor 214 is shown in FIG. 2, in other examples, the processor 214 may include multiple processors (e.g., a CPU and a GPU).

The memory of the electronic device 202 may be any electronic, magnetic, optical, and/or other physical storage device that contains or stores electronic information (e.g., instructions and/or data). The memory may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), non-volatile random-access memory (NVRAM), memristor, flash memory, a storage device, and/or an optical disc, etc. In some examples, the memory may be a non-transitory tangible computer-readable storage medium, where the term "non-transitory" does not encompass transitory propagating signals. The processor 214 may be in electronic communication with the memory. In some examples, a processor 214 and/or memory of the electronic device 202 may be combined with or separate from a processor (e.g., CPU) and/or memory of a host device.

In some examples of the electronic devices described herein, the electronic device 202 may include a Basic Input/Output System (BIOS). As used herein, a basic input/output system (BIOS) refers to hardware or hardware and instructions to initialize, control, or operate an electronic device 202 prior to execution of an operating system (OS) of the electronic device 202. Instructions included within a BIOS may be software, firmware, microcode, or other programming that defines or controls functionality or operation of a BIOS. In one example, a BIOS may be implemented using instructions, such as platform firmware of an electronic device 202, executable by a processor. A BIOS may operate or execute prior to the execution of the OS of an electronic device 202. A BIOS may initialize, control, or operate components such as hardware components of an electronic device 202 and may load or boot the OS of the electronic device 202.

In some examples, a BIOS may provide or establish an interface between hardware devices or platform firmware of the electronic device 202 and an OS of the electronic device 202, via which the OS of the electronic device 202 may control or operate hardware devices or platform firmware of the electronic device 202. In some examples, a BIOS may implement the Unified Extensible Firmware Interface (UEFI) specification or another specification or standard for initializing, controlling, or operating an electronic device 202.

In some examples, the processor 214 may be included as part of the BIOS of the electronic device 202. In this case, the BIOS, using processor 214, may implement the methods described herein for adjusting radio transmissions. In other examples, the processor 214 may be used to execute the OS of the electronic device 202. In these examples, the OS, using the processor 214, may implement the methods described herein for adjusting radio transmissions.

In some examples, the electronic device 202 may include multiple radios for wireless communication. For example, the electronic device 202 may include a first radio 210 and a second radio 212. A radio may include a transmitter to send RF signals. A radio may also include a receiver to receive RF signals. Together, the transmitter and receiver may be referred to as a transceiver.

In some examples, the first radio 210 and the second radio 212 may operate according to different radio access technologies (RATs). For example, the first radio 210 may be a WiFi radio and the second radio 212 may be a BT radio. In another example, the first radio 210 may be a short-range radio (e.g., a WiFi radio or a BT radio) and the second radio 212 may be a long-range radio (e.g., a WWAN radio). The transmission range for a short-range radio may be less than the transmission range of a long-range radio. Therefore, the long-range radio may emit more electromagnetic energy during transmission than a short-range radio.

It should be noted that while two radios (e.g., the first radio 210 and the second radio 212) are shown in FIG. 2, in other examples, the electronic device 202 may include more than two radios. For example, the electronic device 202 may include a WiFi radio, a BT radio and a WWAN radio.

In some examples, the processor 214 may determine that the received transmission 206 includes the indicator 208. For example, upon receiving a transmission 206 (e.g., a WiFi beacon frame or Bluetooth advertising packet), the processor 214 may parse the transmission 206 to determine whether the indicator 208 is present. In an example, the processor 214 may detect the indicator 208 as a particular code, text string, or other information in the payload of the transmission 206.

The processor 214 may change the mode of operation of the electronic device 202 based on the indicator 208. For example, the electronic device 202 may be in a first mode of operation before receiving the indicator 208. While in the first mode of operation, the first radio 210 and the second radio 212 may be in a particular state. For example, both the first radio 210 and the second radio 212 may be active (e.g., enabled) for transmissions at a particular power level and/or on a particular frequency or frequency band.

Upon receiving the indicator 208, the processor 214 may cause the electronic device 202 to enter a second mode of operation. While in the second mode of operation, the first radio 210 and the second radio 212 may be in a state that differs from the first mode of operation.

In some examples, the processor 214 may determine a transmission power level 216 for the first radio 210 based on the indicator 208. For example, the transmission power level 216 may be a maximum power used for transmissions by the first radio 210. In some examples, the indicator 208 may include the transmission power level 216. For example, the transmission power level 216 may be specified as a parameter within the indicator 208. In some examples, the transmission power level 216 may be expressed in milliwatts (mW), in decibels (dBm), or in other units.

In other examples, the electronic device 202 may store the transmission power level 216 for the first radio 210 in memory. For example, the transmission power level 216 may be included in a lookup table stored in memory on the electronic device 202. In this case, upon receiving the indicator 208, the processor 214 may determine the transmission power level 216 from the value stored in memory.

Determining the transmission power level 216 may include the processor 214 applying the transmission power level 216 to the first radio 210. For example, the processor 214 may set the maximum power for transmissions by the first radio 210 at the transmission power level 216.

In some examples, the processor 214 may determine a transmission frequency 218 for the first radio 210 based on the indicator 208. For example, upon receiving the indicator 208, the processor 214 may determine a frequency or a frequency band to use for transmissions by the first radio 210. In other examples, the indicator 208 may designate frequency bands that are not allowed. In some examples, the transmission frequency 218 may be included as a parameter in the indicator 208. In other examples, the transmission frequency 218 may be stored in memory (e.g., in a lookup table) on the electronic device 202. In this case, the processor 214 may obtain the transmission frequency 218 from memory in response to receiving the indicator 208.

Upon determining the transmission frequency 218, the processor 214 may apply the transmission frequency 218 to the first radio 210. In some examples, applying the transmission frequency 218 may include setting the frequency used by the first radio 210 for transmissions. In some other examples, applying the transmission frequency 218 may include setting a frequency band used by the first radio 210 for transmissions. In yet other examples, applying the transmission frequency 218 may include setting prohibited frequency bands that the first radio 210 is not permitted to use for transmissions.

In some examples, the processor 214 may determine which RATs are allowed based on the indicator 208. For example, the indicator 208 may designate which RATs are allowed and which RATs are prohibited. In this case, the indicator 208 may specify that the RAT (e.g., WiFi or BT) of the first radio 210 is allowed while the RAT (e.g., WWAN) of the second radio 212 is prohibited.

In some examples, the processor 214 may disable transmission of the second radio 212 based on the indicator 208. The processor 214 may cause the second radio 212 to stop transmissions based on the indicator 208. In some examples, the second radio 212 may remain active (e.g., powered on), but transmissions may be stopped. In this case, the receiver of the second radio 212 may remain active. In other examples, the processor 214 may cause the second radio 212 to be inactive (e.g., powered off).

Figure 3:
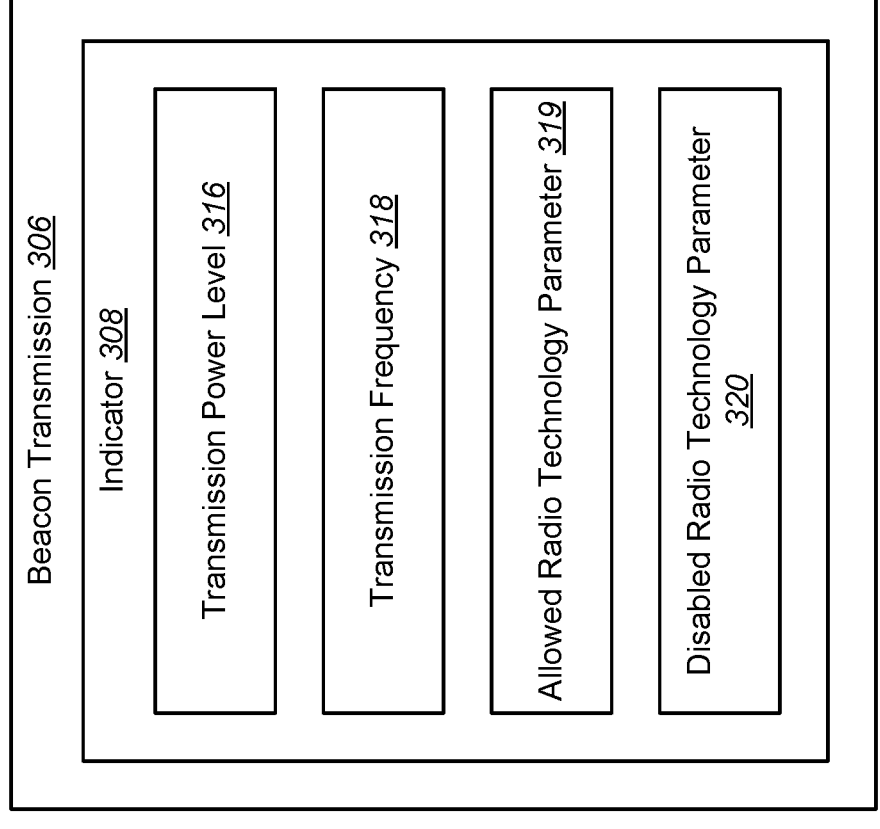
FIG. 3 is an example of a beacon transmission.

FIG. 3 is an example of a beacon transmission 306. In some examples, the beacon transmission 306 may be transmitted by a beacon device, as described in FIGS. 1-2. For example, the beacon transmission 306 may be transmitted by a WiFi device or a BT device. In some examples, the beacon transmission 306 may be a WiFi beacon frame or Bluetooth advertising packet.

In some examples, the indicator 308 may include a particular code (e.g., hex code, bit sequence, etc.) or text string in the payload of the beacon transmission 306. In some examples, the format of a beacon transmission 306 may be defined based on an industry standard (e.g., WiFi, BT, etc.). For example, within the WLAN specification (IEEE 802.11), there are specific formats defined for a WiFi beacon frame (also referred to as an SSID beacon). As part of a WiFi beacon frame, there are information elements that may be defined. For example, an industry standard may provide a mechanism to include "Manufacturer Defined Elements" that provide flexibility to extend the standard for use with features that are not yet defined in the standard.

The presence of a particular defined element (e.g., information element), code, or text string in the beacon transmission 306 may indicate to an electronic device that the electronic device is to modify its mode of operation. For example, the electronic device may adjust and/or disable its radios based on the presence of the indicator 308 in the beacon transmission 306.

In some examples, the indicator 308 may also include parameters that an electronic device is to apply. For example, the indicator 308 may include a transmission power level 316, a transmission frequency 318, an allowed radio technology parameter 319 and/or a disabled radio technology parameter 320.

In the case of the beacon transmission 306, each parameter that is to be transmitted to a client (e.g., the electronic device described in FIGS. 1-2), a separate element may be defined. For example, for the transmission power level 316, the parameter may be defined as "PWR_LEVEL 22", which would indicate to the receiving electronic device that the maximum output power allowed is 22 dBm in this location.

In some examples, the allowed radio technology parameter 319 may indicate RATs (e.g., WiFi, BT) that are allowed to operate. In some examples, the disabled radio technology parameter 320 may indicate RATs (e.g., WWAN) that are to be disabled. In some examples, an electronic device may apply the transmission power level 316 (e.g., a maximum transmission power level) and/or the transmission frequency 318 to the RATs (e.g., WiFi, BT) included in the allowed radio technology parameter 319.

Figure 4:
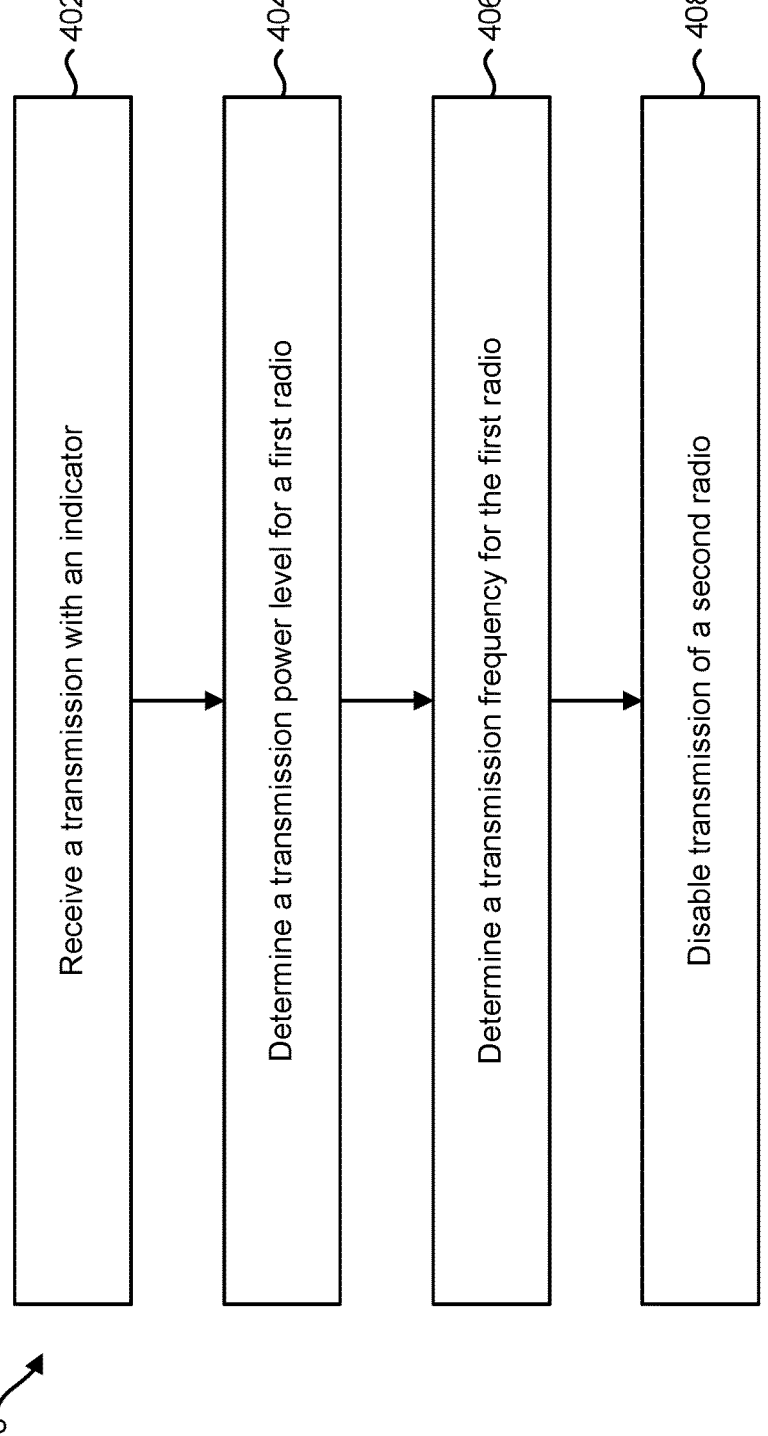
FIG. 4 is a flow diagram illustrating an example of a method for adjusting radio transmissions based on an indicator.

FIG. 4 is a flow diagram illustrating an example of a method 400 for adjusting radio transmissions based on an indicator. The method 400 and/or an element or elements of the method 400 may be performed by an electronic device.

For example, an element or elements of the method 400 may be performed by the electronic device 102 described in FIG. 1; and/or the electronic device 202 or the processor 214 described in FIG. 2, any of which may be referred to generally as an "electronic device" in FIG. 4.

At 402, the electronic device may receive a transmission with an indicator. For example, a first radio (e.g., a WiFi radio or BT radio) of the electronic device may receive the transmission from a beacon device. In some examples, the electronic device includes a first radio and a second radio. The first radio may be a short-range radio (e.g., a WiFi radio or BT radio) and the second radio may be a long-range radio (e.g., a WWAN radio).

The indicator included in the transmission from the beacon device may indicate adjustments to the radios of the electronic device. At 404, the electronic device (e.g., the processor) may determine a transmission power level for the first radio based on the indicator. At 406, the electronic device may determine a transmission frequency for the first radio based on the indicator.

In some examples, the indicator may include the transmission power level and the transmission frequency as parameters, as described in FIG. 3. In this case, the electronic device (e.g., the processor) may read the transmission power level and the transmission frequency from the transmission. The electronic device may then apply the transmission power level and the transmission frequency to the first radio.

In other examples, the electronic device may store the transmission power level and the transmission frequency in memory. The stored transmission power level and the transmission frequency may be applied in response to receiving the indicator.

At 408, the electronic device may disable transmission of the second radio based on the indicator. In some examples, the indicator may specify which RATs are allowed and which RATs are to be disabled. In this case, the electronic device may determine that the RAT (e.g., WWAN) of the second radio is to be disabled. The electronic device may disable the second radio from sending transmissions. In some examples, disabling the second radio may include powering off the second radio. In other examples, the transmitter of the second radio may be deactivated, but the receiver of the second radio may remain active.

Figure 5:
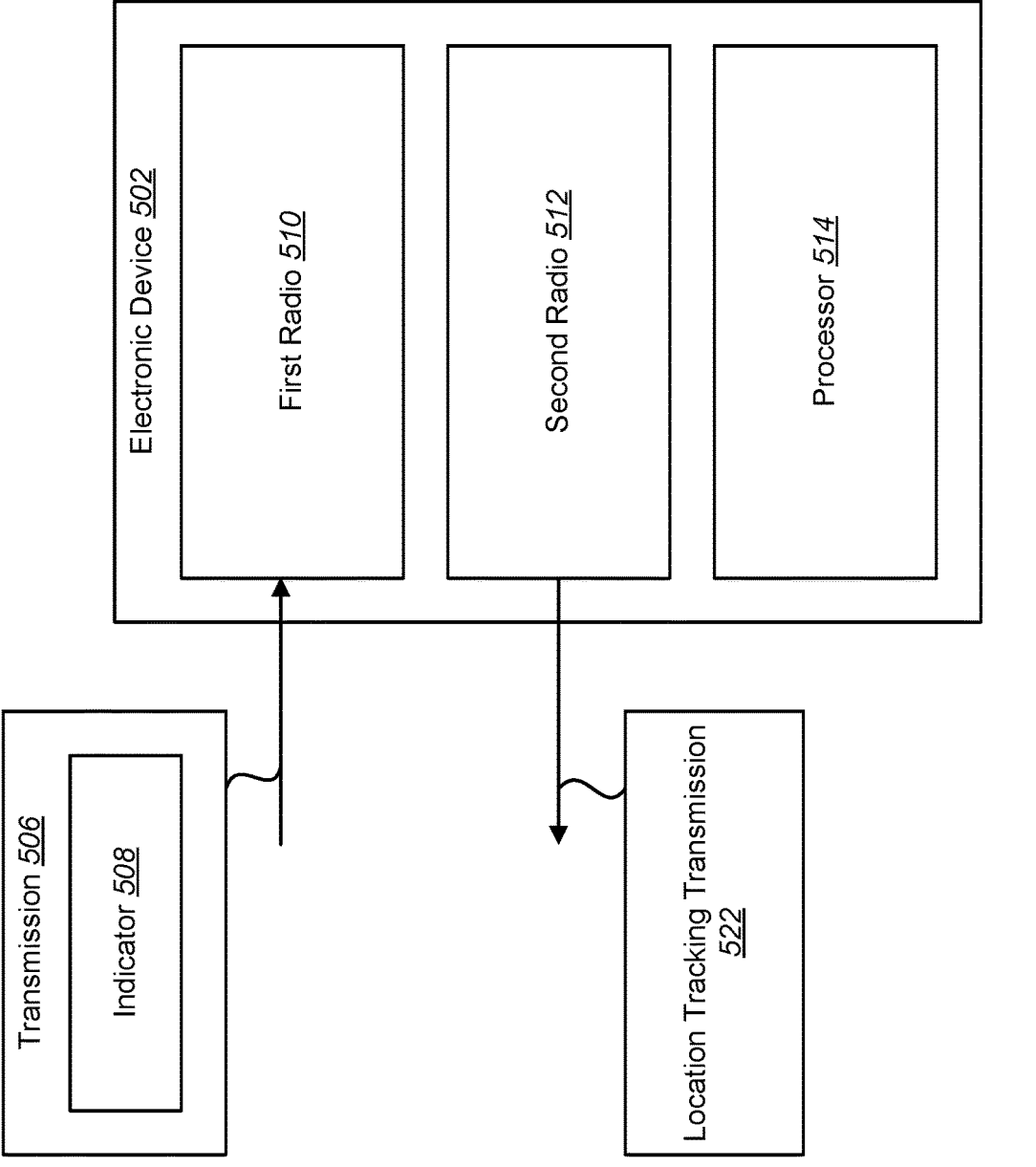
FIG. 5 is a block diagram illustrating another example of an electronic device to adjust radio transmissions based on an indicator.

FIG. 5 is a block diagram illustrating another example of an electronic device 502 to adjust radio transmissions based on an indicator 508. In some examples, the electronic device 502 of FIG. 5 may be implemented as described in FIG. 2. For example, the electronic device 502 may include a first radio 510 and a second radio 512. In the example of FIG. 5, the first radio 510 may be a WiFi radio and the second radio 512 may be a BT radio.

The first radio 510 may receive a transmission 506 that includes an indicator 508. In some examples, the transmission 506 received by the first radio 510 may be a WiFi beacon frame that includes the indicator 508. In some examples, the indicator 508 may indicate a mode of operation for the radios and other functionality of the electronic device 502. In some examples, the indicator 508 may indicate that all transmissions are to be disabled. In other examples, the indicator 508 may indicate that transmissions are to be limited to a maximum power level and/or duty cycle (e.g., time period between transmissions).

The processor 514 of the electronic device 502 may disable the first radio 510 and the second radio 512 in response to receiving the indicator 508. For example, the processor 514 may parse the transmission 506 to detect the indicator 508. The processor 514 may then determine that the indicator 508 instructs the electronic device 502 to disable radio transmissions. The processor 514 may then cause the first radio 510 and the second radio 512 to cease transmission.

In some examples, some functions of the electronic device 502 may have a transmission duty cycle that is low enough to be acceptable for a particular environment (e.g., an aircraft, hospital, etc.). For example, radio transmissions may be used for location tracking of the electronic device 502. In this case, the electronic device 502 may periodically broadcast a location tracking transmission 522 that includes location information of the electronic device 502.

The processor 514 may enable location tracking transmission by the second radio 512 based on the indicator 508. In some examples, the indicator 508 may specify that location tracking transmission is allowed. In other examples, the duty cycle and/or power level for location tracking transmission may be within allowable thresholds specified by the indicator 508.

In yet other examples, the processor 514 may disregard the instruction from the indicator 508 to disable transmissions by the second radio 512 with regard to location tracking transmissions. For example, a user may choose to allow location tracking transmissions to remain operational even if the indicator 508 instructs the electronic device 502 to disable all radio transmissions. In some examples, this setting can be stored in the BIOS of the electronic device 502. Once the electronic device 502 boots up, the setting to ignore the indicator 508 instruction to disable all radio transmissions may be configured on the second radio 512. If the first radio 510 receives an indicator 508 to disable the second radio 512, the processor 514 may stop other functions on the second radio 512, but may enable the location tracking transmission.

As described above, the second radio 512 may be a BT radio. In this case, the location tracking transmission 522 may be a Bluetooth advertising packet.

In some examples, the processor 514 may adjust the beacon advertisement periods for the location tracking transmission 522. For example, in response to receiving the indicator 508, the processor 514 may adjust the period (referred to as a beacon period) between location tracking transmissions to increase the amount of time between transmitting a location tracking transmission 522. Increasing the beacon period may lower the overall battery consumption by the electronic device 502. Increasing the beacon period may also lower the possibility for RF interference with other devices in a particular environment (e.g., on an airplane).

In some examples, the processor 514 may lower the transmission power level for location tracking transmissions in response to receiving the indicator 508. Lowering the transmission power of the second radio 512 may lower the overall battery consumption. Lowering the transmission power may also lower the possibility for RF interference with other devices in a particular environment (e.g., on an airplane). Lowering the transmission power may also improve overall data security, as the connection range will be reduced.

In some examples, the processor 514 may enable the first radio 510 after a period of time to check for the presence of the indicator 508 in another transmission. For example, when the processor 514 disables the first radio 510 in response to receiving the indicator 508, the processor 514 may start a timer for a period of time. Upon expiration of the period of time, the processor 514 may enable the first radio 510. If the first radio 510 receives another transmission that includes an indicator 508, the processor 514 may again disable the first radio 510 for a period of time. However, if the first radio 510 does not receive another transmission that includes an indicator 508, then the processor 514 may enable the first radio 510 and the second radio 512 with full functionality.

Figure 6:
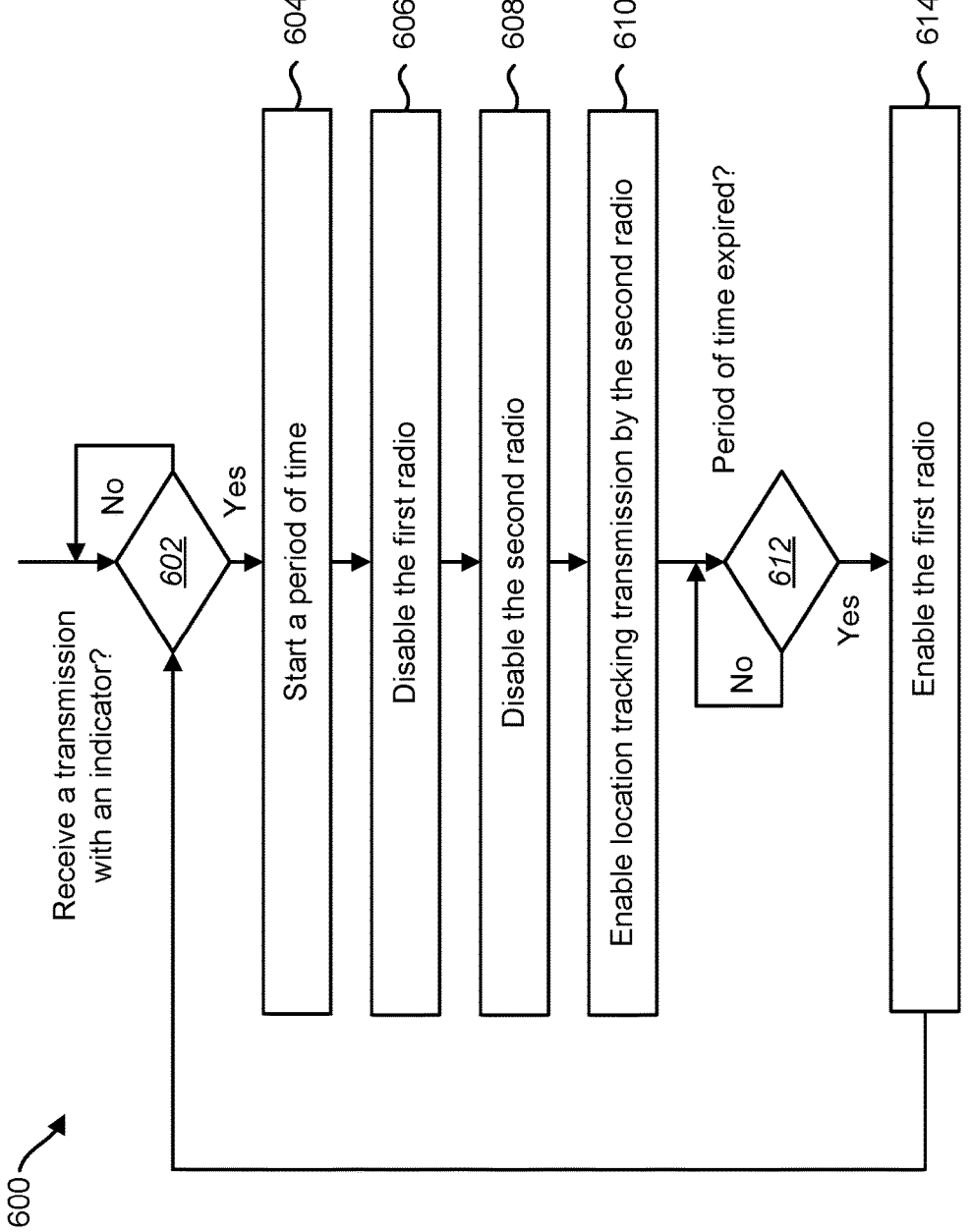
FIG. 6 is a flow diagram illustrating another example of a method for adjusting radio transmissions based on an indicator.

FIG. 6 is a flow diagram illustrating another example of a method 600 for adjusting radio transmissions based on an indicator. The method 600 and/or an element or elements of the method 600 may be performed by an electronic device. For example, an element or elements of the method 600 may be performed by the electronic device 102 described in FIG. 1; the electronic device 202 or the processor 214 described in FIG. 2; and/or the electronic device 502 or the processor 514 described in FIG. 5, any of which may be referred to generally as an "electronic device" in FIG. 6.

At 602, the electronic device may determine whether a transmission with an indicator was received. For example, a first radio (e.g., a WiFi radio) of the electronic device may receive a transmission from a beacon device. If the transmission does not include an indicator, then the electronic device may continue to monitor transmissions for the indicator, at 602.

If the electronic device detects the indicator in a received transmission, then the electronic device may start a period of time, at 604. For example, the electronic device (e.g., the processor) may start a timer for a period of time. This period of time may be an amount of time that the first radio is disabled.

The electronic device may disable the first radio, at 606. The electronic device may also disable a second radio (e.g., a BT radio), at 608 based on the indicator. For example, the indicator may specify that transmissions by the RATs of the first radio and the second radio are prohibited. In another example, the indicator may specify that all radio transmissions over a particular power level are prohibited.

The electronic device may then enable location tracking transmission by the second radio, at 610. For example, the second radio may periodically transmit Bluetooth advertising packets for location tracking. In some examples, the electronic device may increase a period between location tracking transmissions in response to receiving the indicator. In other examples, the electronic device may lower the transmission power level of the location tracking transmissions by the second radio.

At 612, the electronic device may determine whether the period of time has expired. If the period of time has not expired, then the electronic device may continue to wait. Upon expiration of the period of time, the electronic device may enable the first radio, at 614, to check for the indicator in a second transmission. If, at 602, the electronic device receives the indicator in a second transmission, then the electronic device may again start the period of time, at 604, and may disable the first radio, at 606.

If, at 602, the electronic device does not receive the indicator in a second transmission, then the electronic device may continue to monitor for the indicator in another transmission. The electronic device may also enable the second radio for full functionality if the indicator is not present in a transmission, at 602.

Figure 7:
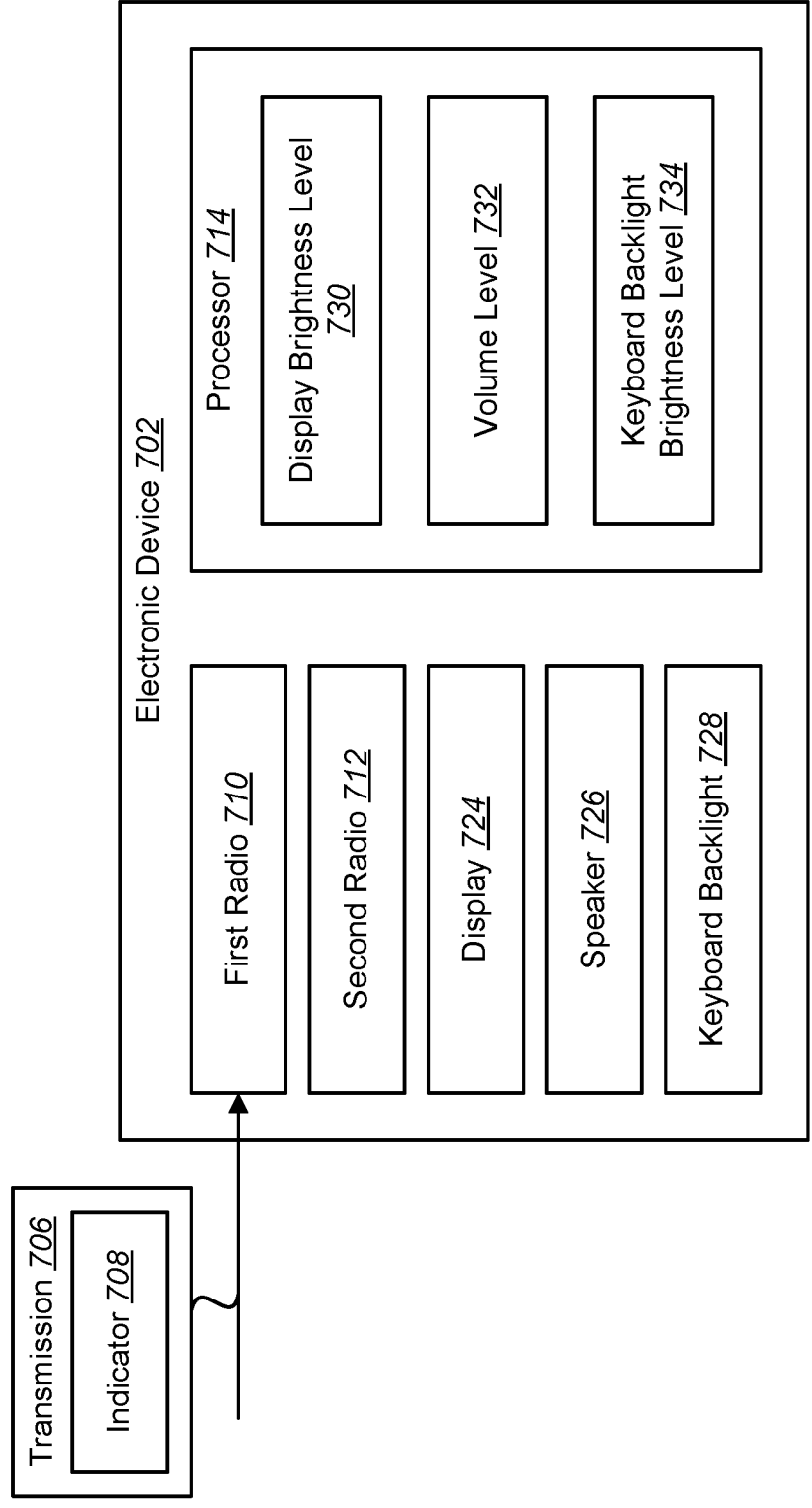
FIG. 7 is a block diagram illustrating yet another example of an electronic device to adjust radio transmissions and device functionality based on an indicator.

FIG. 7 is a block diagram illustrating yet another example of an electronic device 702 to adjust radio transmissions and device functionality based on an indicator 708. In some examples, the electronic device 702 of FIG. 7 may be implemented as described in FIG. 2. In some examples, the electronic device 702 may include processor 714, a first radio 710 and a second radio 712. In an example, the first radio 710 may be a WiFi radio or a BT radio. The second radio 712 may be a WWAN radio.

The first radio 710 may receive a transmission 706 with an indicator 708. As described in FIG. 2, the processor 714 may disable the second radio 712 in response to receiving, by the first radio 710, the transmission 706 with the indicator 708.

In some examples, the processor 714 may adjust functionality of a radio based on the indicator 708. For example, the processor 714 may allow location tracking transmissions by a radio (e.g., the first radio 710) while disabling other functionality (e.g., audio transmissions, mouse connectivity, keyboard connectivity, etc.).

The processor 714 may also adjust functionality of the electronic device 702 in response to receiving the indicator 708. In some examples, the processor 714 may adjust the brightness of light-emitting devices of the electronic device 702. For example, the electronic device 702 may include a display 724. The processor 714 may adjust (e.g., lower) the display brightness level 730 in response to receiving the indicator 708. In another example, the processor 714 may adjust (e.g., lower) the keyboard backlight brightness level 734 of a keyboard backlight 728. In some examples, the processor 714 may enable a dark mode on an operating system (OS) of the electronic device 702.

In some examples, the processor 714 may enable a privacy screen on the display 724 of the electronic device 702 in response to receiving the indicator 708. For example, the processor 714 may cause the display 724 to obscure displayed information.

In some examples, the processor 714 may adjust sound parameters of the electronic device 702 in response to receiving the indicator 708. For example, the processor 714 may adjust the volume level 732 of a speaker 726 in response to receiving the indicator 708. This may include decreasing a maximum volume level 732, muting the speaker 726, or enabling a quiet mode on the electronic device 702.

In some examples, the processor 714 may change a power mode of the electronic device 702 in response to receiving the indicator 708 to conserve battery power. For example, upon receiving the indicator 708, the processor 714 may reduce functionality of hardware devices (e.g., processors, busses, memory, etc.), the OS and/or applications executed by the OS.

In yet other examples, the processor 714 may launch a particular application or a webpage in response to receiving the indicator 708. For example, the indicator 708 may include a uniform resource locator (URL) for a particular webpage (e.g., an airline webpage). The processor 714 may launch a web browser application and load the particular webpage identified in the indicator 708.

FIG. 8 is a block diagram illustrating an example of a computer-readable medium 836 for adjusting radio transmissions and device functionality based on an indicator. The computer-readable medium 836 may be a non-transitory, tangible computer-readable medium 836. The computer-readable medium 836 may be, for example, RAM, EEPROM, a storage device, an optical disc, and the like. In some examples, the computer-readable medium 836 may be volatile and/or non-volatile memory, such as DRAM, EEPROM, MRAM, PCRAM, memristor, flash memory, and the like. In some examples, the computer-readable medium 836 described in FIG. 2 may be an example of memory for an electronic device described in herein. In some examples, code (e.g., data and/or executable code or instructions) of the computer-readable medium 836 may be transferred and/or loaded to memory or memories of the electronic device.

The computer-readable medium 836 may include code (e.g., data and/or executable code or instructions). For example, the computer-readable medium 836 may include disable second radio instructions 838, display brightness instructions 840 and volume adjustment instructions 842.

In some examples, the disable second radio instructions 838 may be instructions that when executed cause the processor of the electronic device to disable a second radio in response to receiving, by a first radio, a transmission that includes an indicator. In some examples, this may be accomplished as described in FIG. 7.

In some examples, the display brightness instructions 840 may be instructions that when executed cause the processor of the electronic device to adjust a brightness level of a display in response to receiving the indicator. For example, the processor may dim the display to a particular brightness level upon receiving the indicator. In some examples, this may be accomplished as described in FIG. 7.

In some examples, the volume adjustment instructions 842 may be instructions that when executed cause the processor of the electronic device to adjust a volume level of a speaker in response to receiving the indicator. For example, the processor may set a maximum volume level for the speaker upon receiving the indicator. In another example, the processor may mute the speaker upon receiving the indicator. In some examples, this may be accomplished as described in FIG. 7.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
a first radio to receive a first transmission comprising an indicator;
a second radio; and
a processor to:
    determine a transmission power level for second transmissions sent by the first radio based on the indicator;
    determine a transmission frequency for the second transmissions sent by the first radio based on the indicator; and
    disable transmission of the second radio based on the indicator.

2. The electronic device of claim 1, wherein the first radio comprises a short-range radio and the second radio comprises a long-range radio.

3. The electronic device of claim 1, wherein:
the first radio comprises a WiFi radio or a Bluetooth radio; and
the second radio comprises a wireless wide area network (WWAN) radio.

4. The electronic device of claim 1, wherein the first transmission comprises a WiFi beacon frame or Bluetooth advertising packet that includes the indicator.

5. The electronic device of claim 1, wherein the indicator includes data identifying the transmission power level and the transmission frequency for the second transmissions sent by the first radio.

6. The electronic device of claim 1, further comprising memory to store the transmission power level and the transmission frequency for the second transmissions sent by the first radio, wherein the processor is to apply the transmission power level and the transmission frequency to the first radio in response to receiving the indicator.

7. The electronic device of claim 1, wherein
the first radio includes circuitry for sending and receiving radio frequency (RF) signals; and
the second radio includes circuitry for sending and receiving RF signals.

8. The electronic device of claim 1, wherein the processor is to apply the transmission power level to the first radio for the second transmissions sent by the first radio.

9. The electronic device of claim 1, wherein the processor is to set the first radio to use the transmission frequency for the second transmissions sent by the first radio.

10. The electronic device of claim 1, wherein the processor is to designate the transmission frequency as forbidden for the second transmissions sent by the first radio.

11. The electronic device of claim 1, wherein the indicator is present as a text string or code in a payload of the first transmission.

12. An electronic device, comprising:
a first radio to receive a transmission comprising an indicator;
a second radio; and
a processor to:
    disable the first radio and the second radio in response to receiving the indicator; and
    enable location tracking transmission to be sent by the second radio based on the indicator.

13. The electronic device of claim 12, wherein:
the first radio comprises a WiFi radio; and
the second radio comprises a Bluetooth radio.

14. The electronic device of claim 12, wherein the transmission received by the first radio comprises a WiFi beacon frame that includes the indicator.

15. The electronic device of claim 12, wherein the location tracking transmission comprises a Bluetooth advertising packet.

16. The electronic device of claim 12, wherein the processor is to increase a period between location tracking transmissions based on the indicator.

17. The electronic device of claim 12, wherein the processor is to enable the first radio after a period of time to check for the indicator in a second transmission.

18. A non-transitory tangible computer-readable medium comprising instructions when executed cause a processor of an electronic device to:
disable a second radio in response to receiving, by a first radio, a transmission from another device, the transmission comprising an indicator;
adjust a brightness level of a display in response to receiving the indicator; and
adjust a volume level of a speaker in response to receiving the indicator.

19. The non-transitory tangible computer-readable medium of claim 18, wherein the processor is to enable a privacy screen on the display of the electronic device in response to receiving the indicator.

20. The non-transitory tangible computer-readable medium of claim 18, wherein the processor is to adjust a brightness level of a keyboard backlight in response to receiving the indicator.

\* \* \* \* \*